UNITED STATES PATENT OFFICE.

MICHEL NICHOLAS D'ANDRIA, OF STRETFORD, ENGLAND.

MANUFACTURE OF COLCOTHAR.

SPECIFICATION forming part of Letters Patent No. 564,731, dated July 28, 1896.

Application filed December 30, 1895. Serial No. 573,818. (No specimens.) Patented in Germany March 13, 1893, No. 5,349, and February 1, 1894, No. 78,639; in England March 13, 1893, No. 5,349, and in France February 7, 1894, No. 236,110.

*To all whom it may concern:*

Be it known that I, MICHEL NICHOLAS D'ANDRIA, a citizen of the United Kingdom of Great Britain and Ireland, residing at Stretford, in the county of Lancaster, England, have invented certain new and useful Improvements in the Manufacture of Colcothar, (for which I have obtained a brevet d'invention in France, No. 236,110, dated February 7, 1894, and patents of the Empire of Germany, No. 5,349, dated March 13, 1893, and No. 78,639, dated February 1, 1894, and in Great Britain, No. 5,349, dated March 13, 1893,) of which the following is a specification.

This invention relates to the preparation or manufacture of that particular oxid of iron which is used as a red pigment and for various other purposes, such as for polishing metals. This red oxid is commonly prepared by roasting ferrous sulfate, ($FeSO_4 7Aq.$,) for the decomposition of which a comparatively high temperature is required, but I have found that by adopting my hereinafter-described improvements a considerably lower temperature may be employed, while at the same time a very much brighter-colored and more finely-divided product is obtained. This physical improvement in the product, apart from the decreased cost of manufacture, makes it a very much more valuable one than that hitherto artificially produced.

In carrying out my invention, I obtain my product from the same source, that is to say, ferrous sulfate, otherwise known as "green copperas," and by roasting, but instead of roasting the ferrous sulfate alone I roast it in the presence of a salt or compound of magnesia which, after the roasting, will be soluble in water, so that the red oxid of iron, which is insoluble, may be separated therefrom by lixiviation.

The most convenient method for carrying my invention into practical effect is to mix the ferrous sulfate with about an equal weight of magnesium sulfate and to roast the compound at a lower temperature than is employed with the existing known process. The correct temperature is indicated as at present by the evolution of sulfuric and sulfurous acid vapors. The duration of the process is also determined as at present by occasionally withdrawing samples for examination.

If, instead of mixing with the ferrous sulfate a soluble salt or compound of magnesium, as just described, I employ an insoluble salt or compound, such as magnesium carbonate, magnesite, or magnesium hydrate, then I may add to the mixture sulfuric acid in about molecular proportion to the base, and thus form magnesium sulfate in the mixture itself. In either case the product is a mixture of a soluble salt of magnesium and red oxid of iron.

The sulfuric and sulfurous acid vapors which are evolved may be conducted to a vitriol-chamber and be utilized in the ordinary manner in the manufacture of sulfuric acid, or the sulfuric acid may be condensed by known means and the sulfurous-acid gas be led to the vitriol-chamber or be otherwise utilized.

The product of the roasting operation, consisting, mainly, of red ferric oxid, ($Fe_2O_3$,) or "colcothar," and magnesium sulfate, is cooled and lixiviated, by which process the magnesium sulphate is separated. The residual red oxid is then dried and packed for use.

The magnesium sulfate may be recovered from its solution and be used in the preparation of further quantities of the red ferric oxid.

Having now particularly described and ascertained the nature of my said invention, I declare that what I claim is—

1. The hereinbefore-described method of manufacture of red oxid of iron or colcothar which consists in roasting a mixture of ferrous sulfate and magnesium sulfate and separating the insoluble red oxid from the cooled product by lixiviation.

2. The herein-described method of manufacture of red oxid of iron or colcothar, which consists in mixing crystals of ferrous sulfate and an insoluble salt of magnesium, adding sulfuric acid, heating the mixture thus formed and separating the insoluble red oxid from the cooled product by lixiviation.

In testimony that I claim the foregoing as my invention I have signed my name, in presence of two witnesses, this 1st day of November, 1895.

MICHEL NICHOLAS D'ANDRIA.

Witnesses:
WILLIAM C. KEYS,
ARTHUR BAKER.